(12) United States Patent
Guen

(10) Patent No.: US 9,324,987 B2  
(45) Date of Patent: Apr. 26, 2016

(54) SECONDARY BATTERY

(75) Inventor: Minhyung Guen, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 512 days.

(21) Appl. No.: 13/048,663

(22) Filed: Mar. 15, 2011

(65) Prior Publication Data

US 2012/0156531 A1    Jun. 21, 2012

(30) Foreign Application Priority Data

Dec. 20, 2010 (KR) ........................ 10-2010-0130956

(51) Int. Cl.
- H01M 2/00 (2006.01)
- H01M 4/64 (2006.01)
- H01M 2/30 (2006.01)
- H01M 2/04 (2006.01)
- H01M 2/12 (2006.01)
- H01M 2/22 (2006.01)
- H01M 2/26 (2006.01)

(Continued)

(52) U.S. Cl.
CPC .............. *H01M 2/30* (2013.01); *H01M 2/043* (2013.01); *H01M 2/0426* (2013.01); *H01M 2/0473* (2013.01); *H01M 2/0486* (2013.01); *H01M 2/12* (2013.01); *H01M 2/22* (2013.01); *H01M 2/263* (2013.01); *H01M 2/365* (2013.01); *H01M 2/0217* (2013.01); *H01M 2/0285* (2013.01); *H01M 2/266* (2013.01)

(58) Field of Classification Search
CPC .................................................. H01M 2/00
USPC ........................................................ 429/53
See application file for complete search history.

(56) References Cited

U.S. PATENT DOCUMENTS

2003/0017385 A1* 1/2003 Frustaci et al. ............... 429/129  
2006/0115725 A1 6/2006 Kim (Continued)

FOREIGN PATENT DOCUMENTS

KR 10-2005-0036312 4/2005  
KR 2006-0101669 A 9/2006

(Continued)

OTHER PUBLICATIONS

KIPO Notice of Allowance dated Oct. 30, 2012 for Korean priority Patent application 10-2010-0130956, (5 pages).

(Continued)

*Primary Examiner* — Jacob Marks  
(74) *Attorney, Agent, or Firm* — Lewis Roca Rothgerber Christie LLP

(57) ABSTRACT

A secondary battery includes an electrode assembly including a first electrode plate, a separator, and a second electrode plate; a first collecting plate electrically coupled to the first electrode plate; a second collecting plate electrically coupled to the second electrode plate; a case containing the electrode assembly, the first collecting plate, and the second collecting plate; a first electrode terminal electrically coupled to the first collecting plate; a second electrode terminal electrically coupled to the second collecting plate; a first plate coupled to the first collecting plate and the first electrode plate and configured to seal the case; a second plate coupled to the second collecting plate and the second electrode terminal; and an insulation plate between the first plate and the second plate.

16 Claims, 5 Drawing Sheets

(51) Int. Cl.
*H01M 2/36* (2006.01)
*H01M 2/02* (2006.01)

(56) References Cited

U.S. PATENT DOCUMENTS

| | | | |
|---|---|---|---|
| 2006/0208700 A1 | 9/2006 | Kim et al. | |
| 2009/0274947 A1* | 11/2009 | Nesvadba et al. | 429/50 |
| 2009/0286158 A1* | 11/2009 | Howard et al. | 429/220 |
| 2010/0266894 A1* | 10/2010 | Byun et al. | 429/178 |
| 2010/0330410 A1* | 12/2010 | Takahashi et al. | 429/129 |

FOREIGN PATENT DOCUMENTS

| | | |
|---|---|---|
| KR | 10-2007-0014657 | 2/2007 |
| KR | 10-0696666 | 3/2007 |
| KR | 2007-0041986 | 4/2007 |
| KR | 10-0728193 A | 6/2007 |

OTHER PUBLICATIONS

Korean Patent Abstract for KR Publication 10-2007-0041986 dated Apr. 20, 2007 corresponds to Korean Patent 10-0728193.

* cited by examiner

SECONDARY BATTERY

CROSS-REFERENCE TO RELATED APPLICATION

This application claims priority to and the benefit of Korean Patent Application No. 10-2010-0130956 filed in the Korean Intellectual Property Office on Dec. 20, 2010, the entire content of which is incorporated herein by reference.

BACKGROUND

1. Field

Embodiments of the present invention relate to a secondary battery.

2. Description of Related Art

Secondary batteries are rechargeable, unlike primary batteries. Among such secondary batteries, a low capacity battery including a battery cell in the form of a pack may be used for small portable electronic devices such as cellular phones and camcorders, and a high capacity battery including a plurality (e.g., dozens) of battery cells connected to one another may be used as a motor-driving power source for electric scooters, hybrid vehicles, or electric vehicles.

Secondary batteries are manufactured in various shapes such as cylindrical shapes and prismatic shapes. A secondary battery may be constructed as follows: an electrode assembly is formed by placing an insulating separator between a positive electrode plate and a negative electrode plate; the electrode assembly is placed in a case together with electrolyte, and a cap plate is placed on the case. The electrode assembly is connected to positive and negative terminals which protrude from the cap plate and are exposed to the exterior of the electrode assembly.

SUMMARY

An aspect of the present invention provides a secondary battery in which an electrode terminal and a plate are combined as one part to simplify manufacturing processes and reduce costs.

According to an embodiment, a secondary battery includes: an electrode assembly comprising a first electrode plate, a separator, and a second electrode plate; a first collecting plate electrically coupled to the first electrode plate; a second collecting plate electrically coupled to the second electrode plate; a case containing the electrode assembly, the first collecting plate, and the second collecting plate; a first electrode terminal electrically coupled to the first collecting plate; a second electrode terminal electrically coupled to the second collecting plate; a first plate coupled to the first collecting plate and the first electrode plate and configured to seal the case; a second plate coupled to the second collecting plate and the second electrode terminal; and an insulation plate between the first plate and the second plate.

The insulation plate may include a material selected from the group consisting of polyphenylene sulfide (PPS), polyethylene (PE), polypropylene (PP), polybutylene terephthalate (PBT), polyamide (PA), and combinations thereof.

The first electrode terminal may be welded to the first plate at a location near a first end of the first plate, and a first hole may be formed at a location near a second end of the first plate opposite the first end.

The second electrode terminal may be inserted in the first hole.

The first plate may include aluminum.

The second electrode terminal may be welded to the second plate at a location near a first end of the second plate, and a second hole may be formed at a location near a second end of the second plate opposite the first end.

The first collecting plate may be inserted in the second hole.

The second electrode terminal may be inserted in a first hole formed in the first plate at a location near an end of the first plate and a first hole formed in the insulation plate at a location near an end of the insulation plate.

A protrusion may be formed around the first hole of the insulation plate, and the protrusion may be inserted through the first hole of the first plate.

The first collecting plate may be inserted through a second hole formed in the insulation plate at a location near an end of the insulation plate and a second hole formed in the second plate.

The second plate may include copper.

The first collecting plate and the first plate may be welded together.

The second collecting plate and the second plate may be welded together.

The secondary battery may further include a safety vent in the first plate between the first electrode and a first hole of the first plate; a third hole in the second plate between the second electrode terminal and a second hole of the second plate; and a third hole in the insulation plate between first and second holes of the insulation plate, wherein the safety vent, the third hole of the second plate, and the third hole of the insulation plate have corresponding sizes.

The secondary battery may further include: an electrolyte injection hole in the first plate between the safety vent and the first electrode terminal of the first plate; a fourth hole in the second plate between the second and third holes of the second plate; and a fourth hole in the insulation plate between the second and third holes of the insulation plate, wherein the electrolyte injection hole, the fourth hole of the second plate, and the fourth hole of the insulation plate have corresponding sizes.

BRIEF DESCRIPTION OF THE DRAWINGS

The accompanying drawings are included to provide a further understanding of embodiments of the present invention, and are incorporated in and constitute a part of this application. The drawings illustrate exemplary embodiments of the present invention and, together with the description, serve to explain principles of embodiments of the present invention. In the drawings.

DETAILED DESCRIPTION OF THE EMBODIMENTS

Example embodiments will now be described more fully hereinafter with reference to the accompanying drawings;

however, they may be embodied in different forms and should not be construed as limited to the embodiments set forth herein. Rather, these embodiments are provided so that this disclosure will be thorough and complete, and will fully convey the scope of the disclosure to those skilled in the art.

Hereinafter, a secondary battery will be described with reference to the accompanying drawings according to exemplary embodiments.

Figure 1:
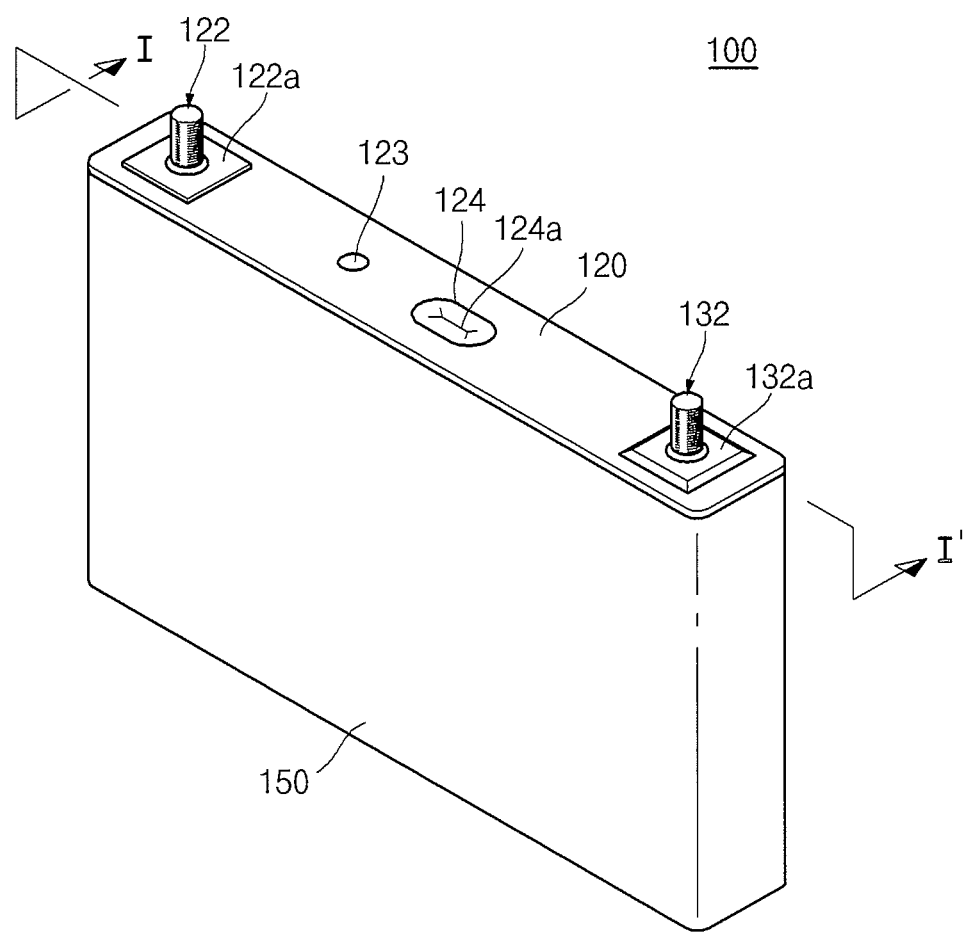
FIG. 1 is a perspective view illustrating a secondary battery according to an embodiment.
Figure 2:
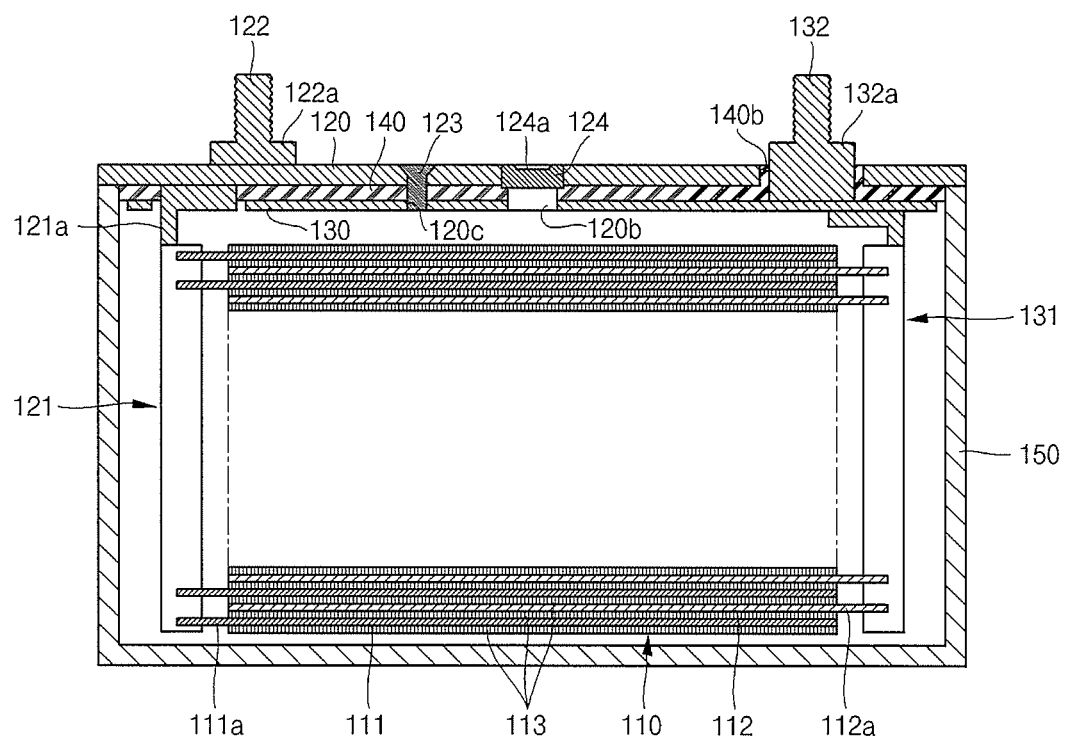
FIG. 2 is a cross-sectional view of the secondary battery of FIG. 1 taken along the line I-I' of FIG. 1.
Figure 3:
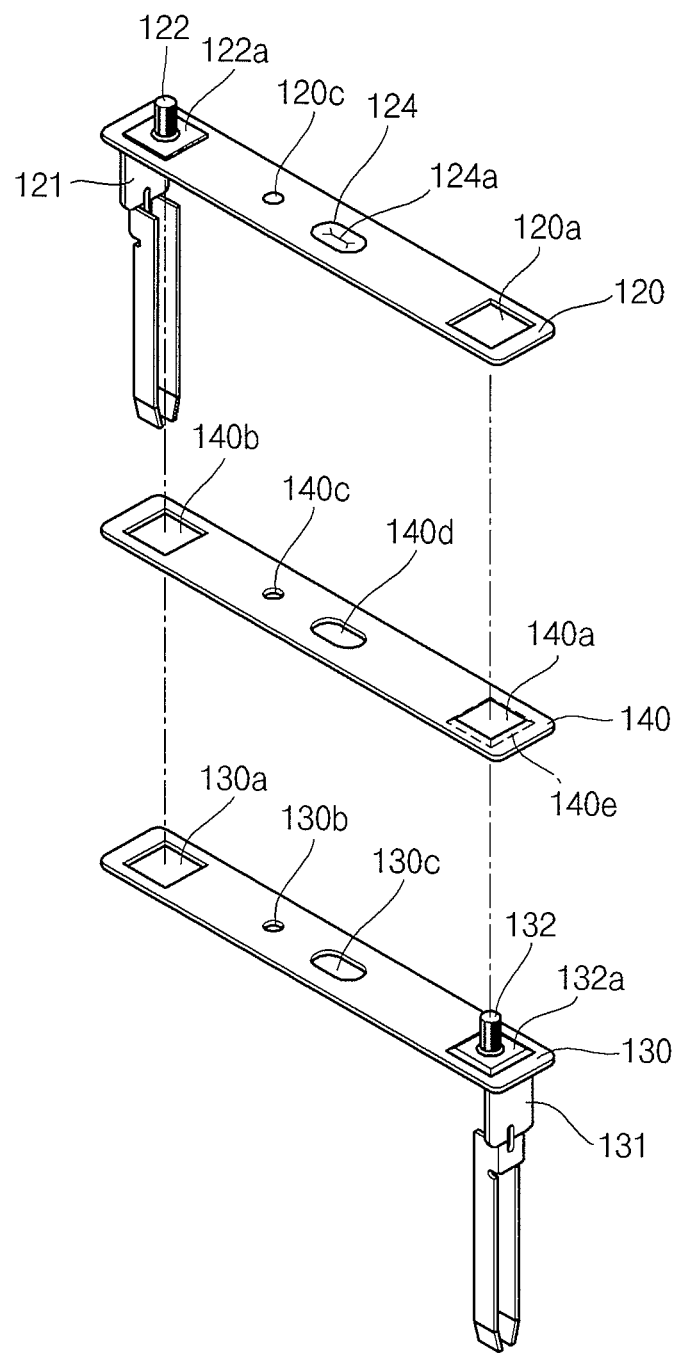
FIG. 3 is an exploded perspective view illustrating a first plate, a second plate, and an insulation plate of the secondary battery illustrated in FIG. 1.
Figure 4A:
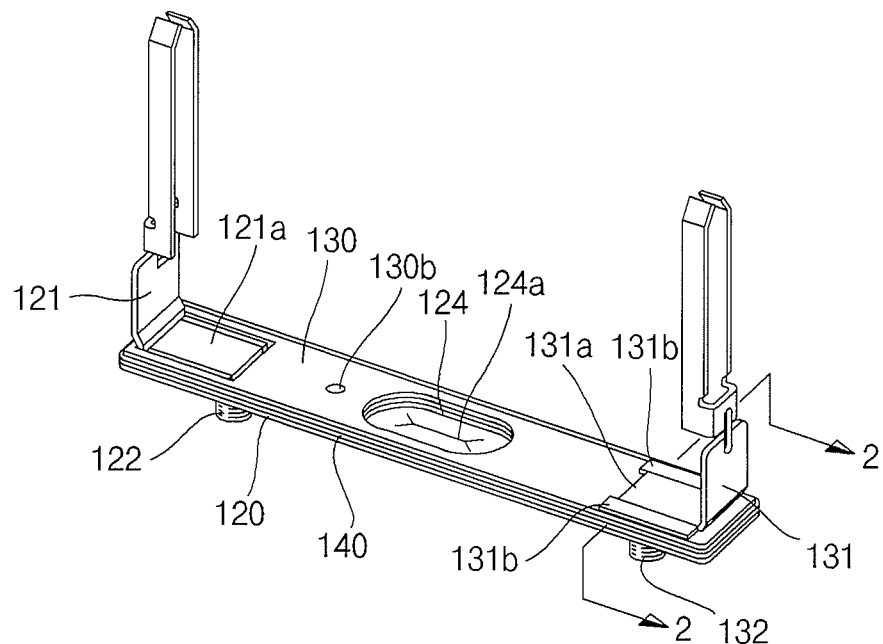
FIG. 4A is a perspective view illustrating an assembled state of the first plate, the second plate, and the insulation plate illustrated in FIG. 3.
Figure 4B:
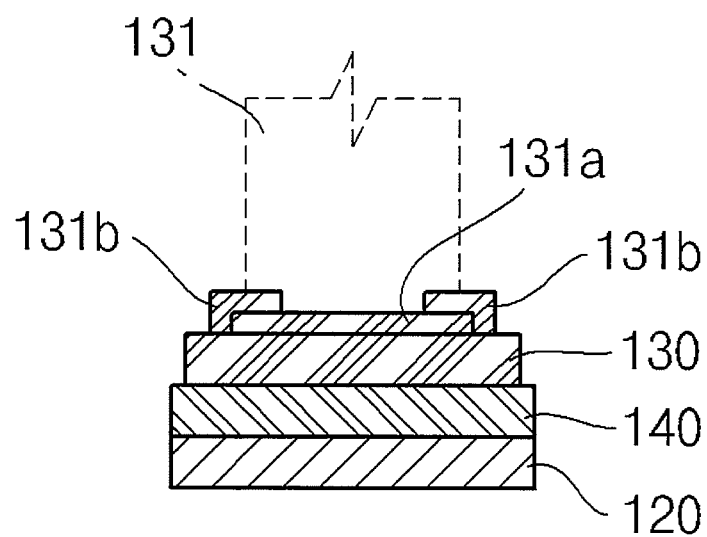
FIG. 4B is a sectional view taken along the line 2-2 of FIG. 4A to illustrate an assembled state of the second plate and a second collecting plate.
Figure 5:
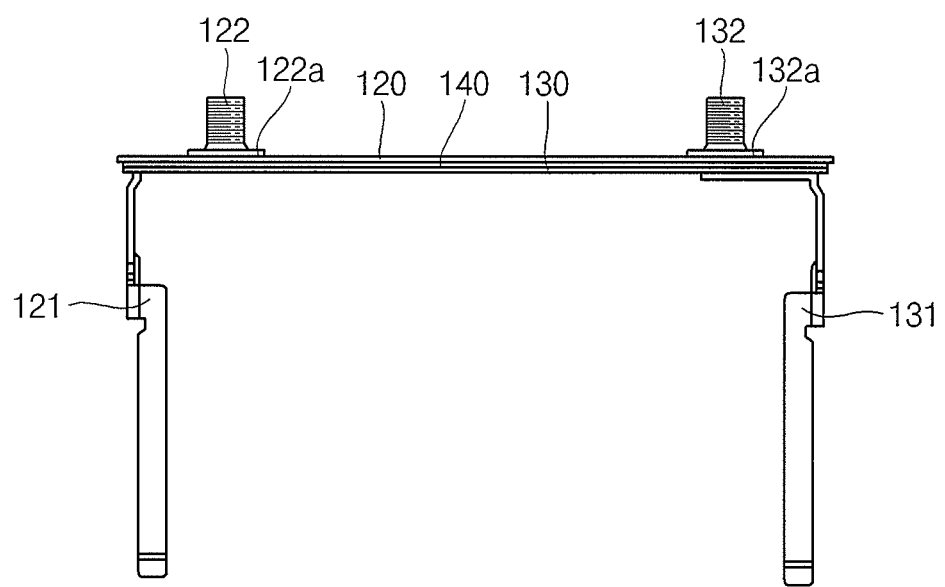
FIG. 5 is a front view illustrating the assembled state of the first plate, the second plate, and the insulation plate of FIG. 3.

First, a secondary battery will be described according to an embodiment. FIG. 1 is a perspective view illustrating a secondary battery 100 according to an embodiment. FIG. 2 is a cross-sectional view of the secondary battery 100 of FIG. 1 taken along the line I-I' of FIG. 1. FIG. 3 is an exploded perspective view illustrating a first plate, a second plate, and an insulation plate of the secondary battery illustrated in FIG. 1. FIG. 4A is a perspective view illustrating an assembled state of the first plate, the second plate, and the insulation plate illustrated in FIG. 3. FIG. 4B is a sectional view taken along the line 2-2 of FIG. 4A to illustrate an assembled state of the second plate and a second collecting plate. FIG. 5 is a front view illustrating the assembled state of the first plate, the second plate, and the insulation plate of FIG. 3.

As shown in FIG. 1 and FIG. 2, the secondary battery 100 of one embodiment includes an electrode assembly 110, a first plate 120, a second plate 130, an insulation plate 140, and a case 150.

The electrode assembly 110 is formed by winding or stacking a first electrode plate 111, a separator 113, and a second electrode plate 112, each of which having a thin plate or film shape. The first electrode plate 111 may function as a negative electrode, and the second electrode plate 112 may function as a positive electrode. In other embodiments, the first electrode plate 111 and the second electrode plate 112 may have opposite polarities (e.g., the first electrode plate 111 may function as a positive electrode and the electrode plate 112 may function as a negative electrode).

The first electrode plate 111 is formed by applying a first electrode active material such as graphite or carbon to a first electrode collector formed of metal foil such as nickel or copper foil. The first electrode plate 111 includes a first electrode non-coating portion 111a to which the first electrode active metal is not applied. The first electrode non-coating portion 111a functions as a current flow passage between the first electrode plate 111 and the outside of the first electrode plate 111. In the described embodiment, materials that can be used to form the first electrode plate 111 are not limited to the above-mentioned materials.

The second electrode plate 112 is formed by applying a second electrode active material such as a transition metal oxide to a second electrode collector formed of metal foil such as aluminum foil. The second electrode plate 112 includes a second electrode non-coating portion 112a to which the second electrode active metal is not applied. The second electrode non-coating portion 112a functions as a current flow passage between the second electrode plate 112 and the outside of the second electrode plate 112. In the described embodiment, materials that can be used to form the second electrode plate 112 are not limited to the above-mentioned materials.

The polarities of the first and second electrode plates 111 and 112 may be changed with each other.

The separator 113 may be interposed between the first electrode plate 111 and the second electrode plate 112 to prevent a short circuit and allow movement of ions such as lithium ions. The separator 113 may be formed of a polyethylene film, a polypropylene film, or a film including polyethylene and polypropylene. In the described embodiment, materials that can be used to form the separator 113 are not limited to the above-mentioned materials.

The first and second plates 120 and 130 are coupled to the end parts of the electrode assembly 110 in a manner such that the first and second plates 120 and 130 are electrically coupled (or electrically connected) to the first and second electrode plates 111 and 112, respectively.

The electrode assembly 110 is accommodated in the case 150 together with electrolyte. The electrolyte may include an organic solvent such as ethylene carbonate (EC), propylene carbonate (PC), diethyl carbonate (DEC), ethyl methyl carbonate (EMC), and dimethyl carbonate (DMC); and a lithium salt such as $LiPF_6$ or $LiBF_4$. The electrolyte may be liquid, solid, or gel.

As shown in FIGS. 2 and 3, the first plate 120 includes a first collecting plate 121, a first electrode terminal 122, a plug 123, and a safety vent 124.

The first plate 120 seals the case 150 (described later). The first plate 120 may be formed of aluminum or an aluminum alloy. The first electrode terminal 122 may be welded near one end (e.g., a first end) of the first plate 120, and a first hole 120a may be formed through the first plate 120 near an end (e.g., a second end) opposite to the end near which the first electrode terminal 122 is welded. A second electrode terminal 132 is inserted in the first hole 120a. Thus, the first hole 120a is sized such that the second electrode terminal 132 can be inserted in the first hole 120a.

The first plate 120 includes the safety vent 124 between the first hole 120a and the first electrode terminal 122. An electrolyte injection hole 120c is formed between the first electrode terminal 122 and the safety vent 124 of the first plate 120.

The first collecting plate 121 makes contact with a first electrode non-coating portion 111a protruding from an end of the electrode assembly 110. The first collecting plate 121 is welded to the first electrode non-coating portion 111a. The first collecting plate 121 has an approximately L-shape (or an approximately reverse L-shape). Similar to the first electrode terminal 122, the first collecting plate 121 may be formed of aluminum or an aluminum alloy. In one embodiment, the first collecting plate 121 is welded to the first plate 120.

As shown in FIG. 3, the first collecting plate 121 is inserted through a second hole 140b formed at an end (or near an end) of the insulation plate 140 and a second hole 130a formed in the second plate 130.

The first collecting plate 121 includes a first bent part 121a (see FIG. 2). The first bent part 121a is bent from the first collecting plate 121 approximately at a right angle and is welded to the bottom side of the first plate 120 as a part of the first plate 120.

The first electrode terminal 122 is electrically coupled (or electrically connected) to the first electrode plate 111 shown in FIG. 2. The first electrode terminal 122 may be formed of the same material as that used to form the first plate 120. For example, the first electrode terminal 122 may be formed of aluminum. The first electrode terminal 122 includes a first connection part 122a at a lower end. The connection part 122a is wider than the first electrode terminal 122. The first connection part 122a may have an approximately hexahedron shape. The first connection part 122a is welded to the first plate 120 as a part of the first plate 120.

The plug 123 seals the electrolyte injection hole 120c of the first plate 120.

The safety vent 124 is located (or arranged) on a vent hole 120b of the first plate 120, and a notch 124a is formed in the safety vent 124 so that the safety vent 124 can be opened (e.g., opened at a preset pressure).

The second plate 130 includes a second collecting plate 131 and the second electrode terminal 132.

The second plate 130 is located under the first plate 120. The second plate 130 may be formed of copper or a copper alloy. The second plate 130 and the second collecting plate 131 are welded together. The second electrode terminal 132 may be welded near one end (e.g., a first end) of the second plate 130, and the second hole 130a may be formed through the second plate 130 near an end (e.g., a second end) opposite to the end near which the second electrode terminal 132 is welded. The second hole 130a has a size such that the first collecting plate 121 can be inserted in the second hole 130a.

A fourth hole 130c (which may be referred to as a third hole) may be formed at a center part between the second electrode terminal 132 and the second hole 130a of the second plate 130. A third hole 130b (which may be referred to as a fourth hole) may be formed between the second hole 130a and the fourth hole 130c of the second plate 130. The third hole 130b has a size corresponding to the size of the electrolyte injection hole 120c of the first plate 120. The fourth hole 130c has a size corresponding to the size of the safety vent 124 of the first plate 120.

The second collecting plate 131 makes contact with the second electrode non-coating portion 112a protruding from an end of the electrode assembly 110. The second collecting plate 131 is welded to the second electrode non-coating portion 112a. The second collecting plate 131 has an approximately L-shape (e.g., an approximately reverse L-shape). The second collecting plate 131 is welded to the second plate 130.

As shown in FIGS. 4A and 4B, the second collecting plate 131 includes a second bent part 131a and second lateral parts 131b.

The second bent part 131a is bent from the second collecting plate 131 approximately at a right angle and is welded to the bottom side of the second plate 130 as a part of the second plate 130. The second lateral parts 131b are disposed at sides (e.g., edges) of the second bent part 131a and are spaced apart from each other by a distance corresponding to the width (or length) of the second bent part 131a. After the second bent part 131a is coupled to the second lateral parts 131b by sliding the second bent part 131a into the second lateral parts 131b, the second bent part 131a is fixed to the second collecting plate 131 by welding. The first collecting plate 121 and the first plate 120 may be coupled to each other in substantially the same way.

The second electrode terminal 132 is electrically coupled (or electrically connected) to the second electrode plate 112 (see FIG. 2). Like the second plate 130, the second electrode terminal 132 may be formed of copper or a copper alloy. The second electrode terminal 132 may have the same or a similar shape as that of the first electrode terminal 122. Thus, the shape of the second electrode terminal 132 will not be described.

Referring to FIG. 3, the second electrode terminal 132 is inserted through the first hole 120a formed in an end (or near an end) of the first plate 120 and a first hole 140a formed in an end (or near an end) of the insulation plate 140.

A second connection part 132a is disposed between the second electrode terminal 132 and the second plate 130. The second connection part 132a has a height or size corresponding to the thicknesses of the first plate 120 and the insulation plate 140.

The width of the second plate 130 may be smaller than that of the first plate 120. The first plate 120 is electrically coupled to the case 150 by welding, and the second plate 130 is not electrically connected to the case 150 in order to prevent a short circuit.

The insulation plate 140 is disposed between the first and second plates 120 and 130 to electrically insulate the first and second plates from each other. The insulation plate 140 may be formed of an insulating material which has high heat resistance, strength, and electrical insulating properties and does not react with an electrolyte. For example, the insulation plate 140 may be formed of a material selected from polyamide, polyphenylene sulfide resin, and polypropylene. However, materials that can be used to form the insulation plate 140 are not limited thereto.

The first hole 140a and the second hole 140b are formed in both ends (e.g., opposite ends) of the insulation plate 140. The first collecting plate 121 is inserted in the second hole 140b, and the second hole 140b has substantially the same size as that of the second hole 130a of the second plate 130. The second electrode terminal 132 is inserted in the first hole 140a, and the first hole 140a has substantially the same size as that of the first hole 120a of the first plate 120. A protrusion 140e having a height corresponding to the thickness of the first plate 120 is formed at the first hole 140a (e.g., along the circumference of the first hole 140a). The protrusion 140e is inserted through the first hole 120a of the first plate 120. Therefore, the protrusion 140e insulates the first plate 120 and the second electrode terminal 132 from each other.

A fourth hole 140d (which may be referred to as a third hole) may be formed in a center part between the first and second holes 140a and 140b of the insulation plate 140. A third hole 140c (which may be referred to as a fourth hole) may be formed between the second and fourth holes 140b and 140d of the insulation plate 140. The third hole 140c has a size corresponding to the size of the electrolyte injection hole 120c of the first plate 120. The fourth hole 140d has a size corresponding to the size of the safety vent 124 of the first plate 120.

That is, when the first plate 120, the second plate 130, and the insulation plate 140 are assembled as shown in FIG. 5, the safety vent 124 of the first plate 120, the fourth hole 130c of the second plate 130, and the fourth hole 140d of the insulation plate 140 are aligned with each other and have substantially the same size. In addition, the electrolyte injection hole 120c of the first plate 120, the third hole 130b of the second plate 130, and the third hole 140c of the insulation plate 140 are aligned with each other and have substantially the same size.

The case 150 may be formed of a conductive metal such as aluminum, aluminum alloy, or steel plated with nickel. The case 150 may have an approximately hexahedral shape with an opening so that the electrode assembly 110, the first collecting plate 121, and the second collecting plate 131 can be inserted and placed in the case 150. The inner surface of the case 150 may be treated so that the case 150 can be electrically insulated from the electrode assembly 110, the first collecting plate 121, and the second collecting plate 131.

According to embodiments of the present invention, since the electrode terminals and the plates of the secondary battery are combined as one part, manufacturing processes can be simple, and costs can be reduced.

In addition, since the electrode terminals and the plates of the secondary battery are combined as one part, leakage of electrolyte can be reduced or prevented.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present disclosure as set forth in the following claims and their equivalents.

What is claimed is:

1. A secondary battery comprising:
an electrode assembly comprising a first electrode plate, a separator, and a second electrode plate;
a first collecting plate electrically coupled to the first electrode plate;
a second collecting plate electrically coupled to the second electrode plate;
a case having an opening for receiving the electrode assembly, the first collecting plate, and the second collecting plate;
a first electrode terminal electrically coupled to the first collecting plate;
a second electrode terminal electrically coupled to the second collecting plate;
a first plate electrically coupled to the first collecting plate and the first electrode plate and configured to seal the case by covering substantially entire said opening of the case;
a second plate coupled to the second collecting plate and the second electrode terminal; and
an insulation plate between the first plate and the second plate,
wherein the second electrode terminal is welded to the second plate at a location near a first end of the second plate, and a collecting plate hole is formed at a location near a second end of the second plate opposite the first end, and
wherein the first collecting plate is inserted in the collecting plate hole.

2. The secondary battery as claimed in claim 1, wherein the insulation plate comprises a material selected from the group consisting of polyphenylene sulfide (PPS), polyethylene (PE), polypropylene (PP), polybutylene terephthalate (PBT), polyamide (PA), and combinations thereof.

3. The secondary battery as claimed in claim 1, wherein the first electrode terminal is welded to the first plate at a location near a first end of the first plate, and a first hole is formed at a location near a second end of the first plate opposite the first end.

4. The secondary battery as claimed in claim 3, wherein the second electrode terminal is inserted in the first hole.

5. The secondary battery as claimed in claim 1, wherein the first plate comprises aluminum.

6. The secondary battery as claimed in claim 1, wherein the second electrode terminal is inserted in a first hole formed in the first plate at a location near an end of the first plate and a first hole formed in the insulation plate at a location near an end of the insulation plate.

7. The secondary battery as claimed in claim 6, wherein a protrusion is formed around the first hole of the insulation plate, and the protrusion is inserted through the first hole of the first plate.

8. The secondary battery as claimed in claim 1, wherein the first collecting plate is inserted through a collecting plate hole formed in the insulation plate at a location near an end of the insulation plate and the collecting plate hole formed in the second plate.

9. The secondary battery as claimed in claim 1, wherein the second plate comprises copper.

10. The secondary battery as claimed in claim 1, wherein the first collecting plate and the first plate are welded together.

11. The secondary battery as claimed in claim 1, wherein the second collecting plate and the second plate are welded together.

12. The secondary battery as claimed in claim 1, further comprising:
a safety vent in the first plate between the first electrode terminal and a first hole of the first plate;
an alignment hole in the second plate between the second electrode terminal and the collecting plate hole of the second plate; and
a third hole in the insulation plate between first and second holes of the insulation plate,
wherein the safety vent, the alignment hole of the second plate, and the third hole of the insulation plate have corresponding sizes.

13. The secondary battery as claimed in claim 12, further comprising:
an electrolyte injection hole in the first plate between the safety vent and the first electrode terminal of the first plate;
between hole in the second plate between the collecting plate hole and the alignment hole of the second plate; and
a fourth hole in the insulation plate between the second and third holes of the insulation plate,
wherein the electrolyte injection hole, the between hole of the second plate, and the fourth hole of the insulation plate have corresponding sizes.

14. A secondary battery comprising:
an electrode assembly comprising a first electrode plate, a separator, and a second electrode plate;
a first collecting plate electrically coupled to the first electrode plate;
a second collecting plate electrically coupled to the second electrode plate;
a case containing the electrode assembly, the first collecting plate, and the second collecting plate;
a first electrode terminal electrically coupled to the first collecting plate;
a second electrode terminal electrically coupled to the second collecting plate;
a first plate coupled to the first collecting plate and the first electrode plate and configured to seal the case;
a second plate coupled to the second collecting plate and the second electrode terminal; and
an insulation plate between the first plate and the second plate,
wherein the second electrode terminal is welded to the second plate at a location near a first end of the second plate, and a second hole is formed at a location near a second end of the second plate opposite the first end, and the first collecting plate is inserted in the second hole.

15. A secondary battery comprising:
an electrode assembly comprising a first electrode plate, a separator, and a second electrode plate;
a first collecting plate electrically coupled to the first electrode plate;
a second collecting plate electrically coupled to the second electrode plate;
a case containing the electrode assembly, the first collecting plate, and the second collecting plate;
a first electrode terminal electrically coupled to the first collecting plate;
a second electrode terminal electrically coupled to the second collecting plate;
a first plate coupled to the first collecting plate and the first electrode plate and configured to seal the case;
a second plate coupled to the second collecting plate and the second electrode terminal;

an insulation plate between the first plate and the second plate;
a safety vent in the first plate between the first electrode terminal and a first hole of the first plate;
a third hole in the second plate between the second electrode terminal and a second hole of the second plate; and
a third hole in the insulation plate between first and second holes of the insulation plate,
wherein the safety vent, the third hole of the second plate, and the third hole of the insulation plate have corresponding sizes.

16. The secondary battery as claimed in claim 15, further comprising:
an electrolyte injection hole in the first plate between the safety vent and the first electrode terminal of the first plate;
a fourth hole in the second plate between the second and third holes of the second plate; and
a fourth hole in the insulation plate between the second and third holes of the insulation plate,
wherein the electrolyte injection hole, the fourth hole of the second plate, and the fourth hole of the insulation plate have corresponding sizes.

* * * * *